(12) United States Patent
Bultje

(10) Patent No.: US 8,737,824 B1
(45) Date of Patent: May 27, 2014

(54) ADAPTIVELY ENCODING A MEDIA STREAM WITH COMPOUND PREDICTION

(75) Inventor: Ronald Sebastiaan Bultje, San Jose, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 13/416,375

(22) Filed: Mar. 9, 2012

(51) Int. Cl.
*H04N 5/93* (2006.01)

(52) U.S. Cl.
USPC .......................................................... 386/353

(58) Field of Classification Search
USPC .......................................................... 386/353
See application file for complete search history.

(56) References Cited

U.S. PATENT DOCUMENTS

| | | | | |
|---|---|---|---|---|
| 2007/0047648 A1* | 3/2007 | Tourapis et al. | ......... | 375/240.13 |
| 2007/0153897 A1* | 7/2007 | Yan | ........................... | 375/240.16 |
| 2009/0175338 A1* | 7/2009 | Segall | ...................... | 375/240.14 |
| 2009/0257492 A1* | 10/2009 | Andersson et al. | ...... | 375/240.12 |
| 2010/0034260 A1* | 2/2010 | Shimizu et al. | .......... | 375/240.12 |
| 2013/0027230 A1* | 1/2013 | Marpe et al. | .................. | 341/107 |

\* cited by examiner

*Primary Examiner* — Thai Tran
*Assistant Examiner* — Nien-Ru Yang
(74) *Attorney, Agent, or Firm* — Young Basile Hanlon & MacFarlane P.C.

(57) ABSTRACT

A system and method for optimizing a compound prediction setting for a media stream and signaling the compound prediction setting is disclosed. A rate distortion optimization using the prediction modes of a compound prediction setting is carried out, and the rate distortion result is extrapolated to different compound prediction settings, without having to process each compound prediction setting separately. The optimal compound prediction setting is selected, and an element is encoded into the bitstream indicating the compound prediction setting that is used. A gradual mode coding scheme is used to minimize the bandwidth cost, and preserve the bandwidth savings of the compound prediction mode.

23 Claims, 10 Drawing Sheets

ADAPTIVELY ENCODING A MEDIA STREAM WITH COMPOUND PREDICTION

TECHNICAL FIELD

This disclosure relates generally to encoding technology and specifically to adaptively encoding and decoding media with different compound prediction settings.

BACKGROUND

The amount of data used to represent digital video media can be large and consume large amounts of costly bandwidth over communications networks. To reduce the quantity of data transmitted over these networks, encoding schemes are used to compress the data before transmission. The data can then be decoded when it is received and processed for playback. Compression techniques can include intra frame predictors and inter frame predictors. Intra prediction (also referred to herein as intra-prediction or intra-frame prediction) and inter frame prediction (also referred to herein as inter-prediction or inter-frame prediction) are techniques used in modern image/video compression schemes. Intra prediction uses pixel values from prior-coded blocks within a same image frame to form a predictor block for a current block. Inter prediction uses pixel values from prior-coded blocks of a different image frame (e.g., a past frame or a future frame) to form a predictor block for a current block. The predictor block is subtracted from the current block; the difference, i.e. a residue block, is encoded and transmitted to decoders.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

Systems and methods disclosed herein relate to adaptively encoding and decoding media with different compound prediction settings and signaling the compound prediction settings in the bitstream to reduce bandwidth costs. Disclosed herein is a system including a detection component that detects whether an element in a bitstream of a frame indicates that a prediction mode for the frame is present and a monitoring component that decodes the element to determine whether the frame uses compound prediction. If the frame uses compound prediction, the monitoring component determines whether all of the frame uses compound prediction or a subset of the frame uses compound prediction.

The detection component also identifies whether an element indicating a prediction mode of the subset of the frame is prepended to the subset of the frame if the monitoring component determines that a subset of the frame uses compound prediction. The subset of the frame can be a macroblock, or it can be a set of macroblocks with a common object identifier.

Also disclosed herein is a media encoding system that includes a testing component that iterates a rate-distortion optimization loop over each macroblock in a frame to determine rate distortion results for prediction modes of a provisional compound prediction setting. Also included is an extrapolation component that determines a rate distortion result for each of a set of compound prediction settings based on the rate distortion results of the provisional compound prediction setting and a compound prediction additional cost variable. An optimization component is also included that compares the rate distortion results for each of the set of compound prediction settings and selects the optimum compound prediction setting. A threshold component can be included to monitor a bitrate of a media stream and instruct the optimization component to select a non-compound prediction mode in response to the bitrate being below a threshold value.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

DETAILED DESCRIPTION

Overview

Figure 1:
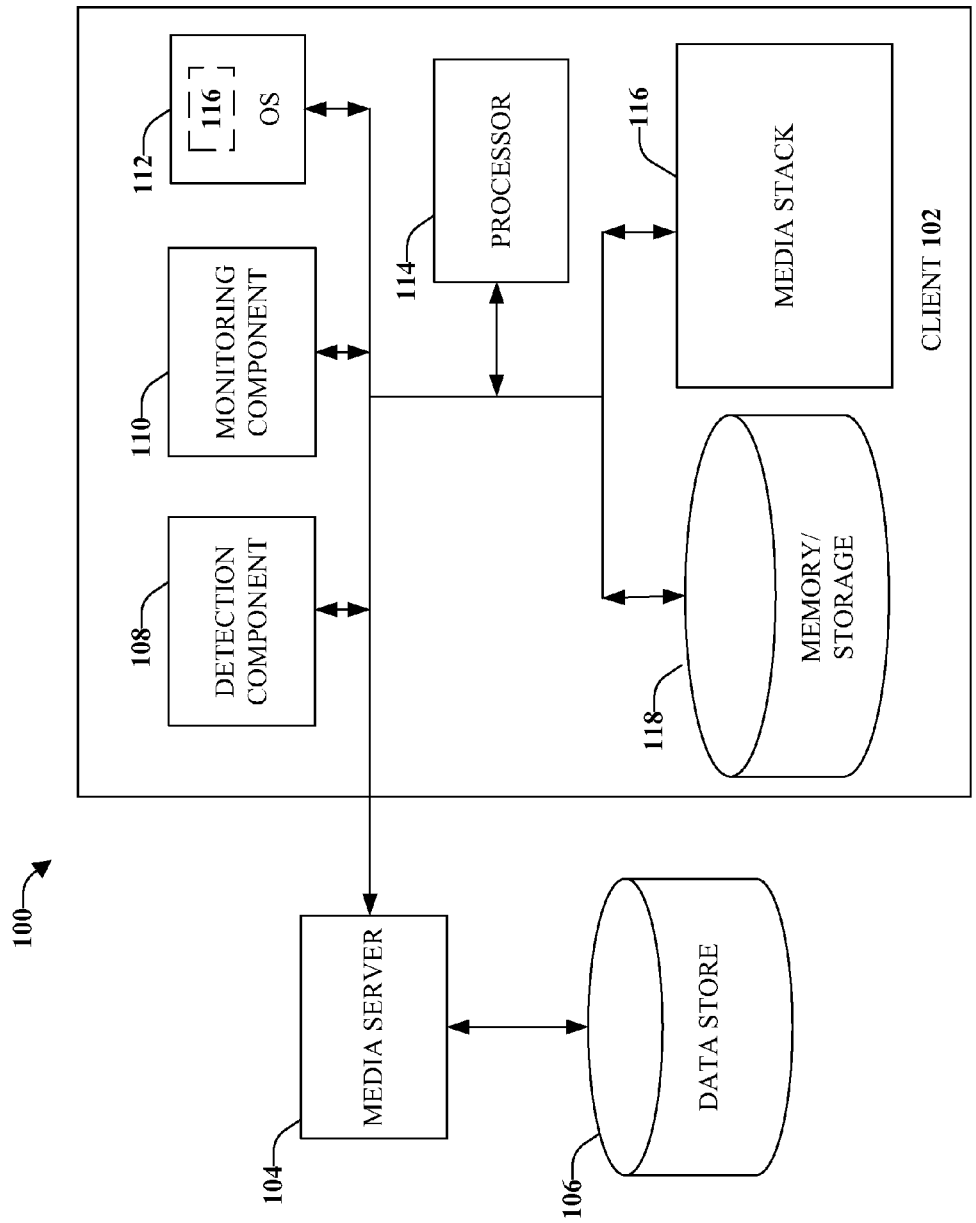
FIG. 1 is a block diagram illustrating an example, non-limiting embodiment of a system that can playback media in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Compound prediction employs a compound predictor for a block or region of a video image. A compound predictor can be created by combining two or more predictors determined using existing (or primary) predictions methods, e.g., (intra+intra, intra+inter or inter+inter). For example, compound inter frame prediction can employ a first motion vector to obtain a predictor from a first frame, and a second motion vector to obtain a predictor from a second frame. The reference frames can both be in the past, both in the future, or some combination thereof. The second motion vector can be independent of, or derived from, the first motion vector. As another example, compound prediction can employ a first predictor outputted from an intra-prediction operation and a second predictor outputted from an inter-prediction operation.

In forming a compound predictor, an encoder can perform averaging, weighted combination, filtering operation, or a more complex form of estimating the significance of the value of each predictor, e.g., on a per-pixel basis and creating a weighted average (for each pixel in the combined predictor) between the two individual predictors. Accordingly, combining predictors can result in a compound predictor that can be an average of the two values or a weighted average that estimates the significance of the value of each predictor, for example.

Compound prediction can reduce, sometimes significantly, the residual error signal that is to be coded, e.g., as discrete cosine transform ("DCT") coefficients. However, there can be a cost in employing compound prediction. For example, in some applications, an optimal compression technique can change from frame to frame depending on the underlying data and bitrate of the media stream. Accordingly, there can be a cost in specifying whether a frame has been encoded using single prediction or compound prediction. An another example, there can a cost in terms of to specify in a bitstream, e.g., as part of a per-macroblock mode, whether a macroblock uses "single" prediction, i.e. the elementary prediction, or "compound" prediction, i.e. the combination of two elementary predictors. Accordingly, there can be a cost in specifying whether a block has been encoded using single prediction or compound prediction. This can be particularly significant in low-bitrate videos, where the cost of modes can be a significant portion of the total video bitrate. In addition, in the encoder, there can be a cost in terms of computational complexity.

Implementations of this disclosure provide techniques for optimizing a compound prediction setting for a media stream and/or signaling the compound prediction.

According to one implementation, a gradual mode coding scheme is implemented. The scheme can include, first, at a frame level, coding a single element that indicates whether the frame as a whole uses compound prediction. In one implementation, this element has three possible values, e.g., 0, 1, and 2. A value of 0 can indicate that the frame uses no compound prediction (off). A value of 1 can indicate that the frame uses compound prediction throughout the frame (on). A value of 2 can indicate that the frame encodes at a lower level (e.g., more granular level) whether compound prediction is used (e.g., hybrid or segment as further described herein).

FIG. 1 illustrates an example, non-limiting embodiment of a system 100 that can receive and playback media data. Aspects of the systems, apparatuses or processes explained in this disclosure can constitute machine-executable component embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described. The system 100 includes a client 102 which can represent a standalone media playback device. The client 102 includes a detection component 108, a monitoring component 110, a processor 114, an operating system 112, a media stack 116, and a memory/storage 118. The components 108, 110, 112, 114, 116, and 118 are communicably coupled to each other. The media stack 116 is configured to facilitate playback of media content. In one embodiment of the present disclosure the media stack 116 can be integrated into a software program. In another embodiment of the present disclosure, the detection component 108 and the monitoring component 110, and the media stack 116 are integrated into a Web browser, which, in turn, communicates with a media server 104. In still another example of the present disclosure, the media stack 116 is a component of the client's operating system 112 or platform (e.g. hardware or firmware). In yet another example of the present disclosure, detection component 108 and monitoring component 110 can each be part of the media stack 116.

In one embodiment of the present disclosure, the media server 104 is located externally to the client 102. The media server 104 is communicably coupled to the data store 106 that contains media content that the media server 104 streams to the client 102. In one embodiment of the present disclosure, the media server 104 and the client 102 are located in the same device.

In one aspect of the present disclosure, the media content is stored in the memory/storage 118 of the client 102, and subsequently processed (e.g. played back) by detection component 108, monitoring component 110 and media stack 116. In this embodiment, the media content can be uploaded to storage 118 by way of a user input device (e.g. compact disk drive) or can be downloaded to storage 118, e.g., via the media server 104. In one implementation, detection component 108, monitoring component 110, and the media stack 116 can process/playback the media content offline (e.g. locally on the client 102 without a network connection to the media server 104). In another embodiment of the present disclosure, the media content can be processed/played back in real time while being transmitted by the media server 104.

According to an aspect of the present disclosure, detection component 108 is configured to detect whether an element in the bitstream of the media content indicates which prediction mode(s) the media content is encoded with. In response to determining that an element indicating a prediction mode is present, monitoring component 110 can analyze/decode the element to determine whether the current frame uses compound prediction. The element can indicate whether the prediction mode applies to an entire frame of the media content, or applies granularly to individual macroblocks or sets of macroblocks within each frame.

According to an aspect of the present disclosure, the monitoring component 110 can determine that the element indicates that the frame does not use compound prediction. Upon determining that the frame does not use compound prediction, media stack 16 can decode and/or processes the media content using intra predictors and inter predictors separately.

In some aspects of the present disclosure, the monitoring component 110 decodes and/or analyzes the element to determine that the frame uses compound prediction throughout the entire frame. In response, media stack 116 can decode and/or process the media content using a combined predictor.

According to another aspect of the present disclosure, the monitoring component 110 determines that the element indicates that part of the frame uses compound prediction. In response to determining that only part of the frame uses compound prediction, detection component 108 can identify whether an element indicating a prediction mode of a subset of the frame is prepended to a subset of the frame. The subset can be a single macroblock, or it can be a set of macroblocks. The set of macroblocks can have a common object identifier that indicates the set of macroblocks are related to an object depicted in the media content.

In the subject disclosure, the term media stack is used to refer to a component that is used to de-multiplex, decrypt, decode and/or render media content. It is to be appreciated that in some embodiments, the media stack 116 may not perform the de-multiplexing and/or rendering functions. According to an aspect of the present disclosure, the detection component 108, the monitoring component 110, and/or the media stack 116 can be implemented in hardware, firmware or machine code. In an embodiment of the present disclosure, the media stack 116 is implemented in a network browser application (e.g. as a separate application program from the other components). In such an embodiment, the browser application itself can be referred herein to as a media stack 116.

Figure 2:
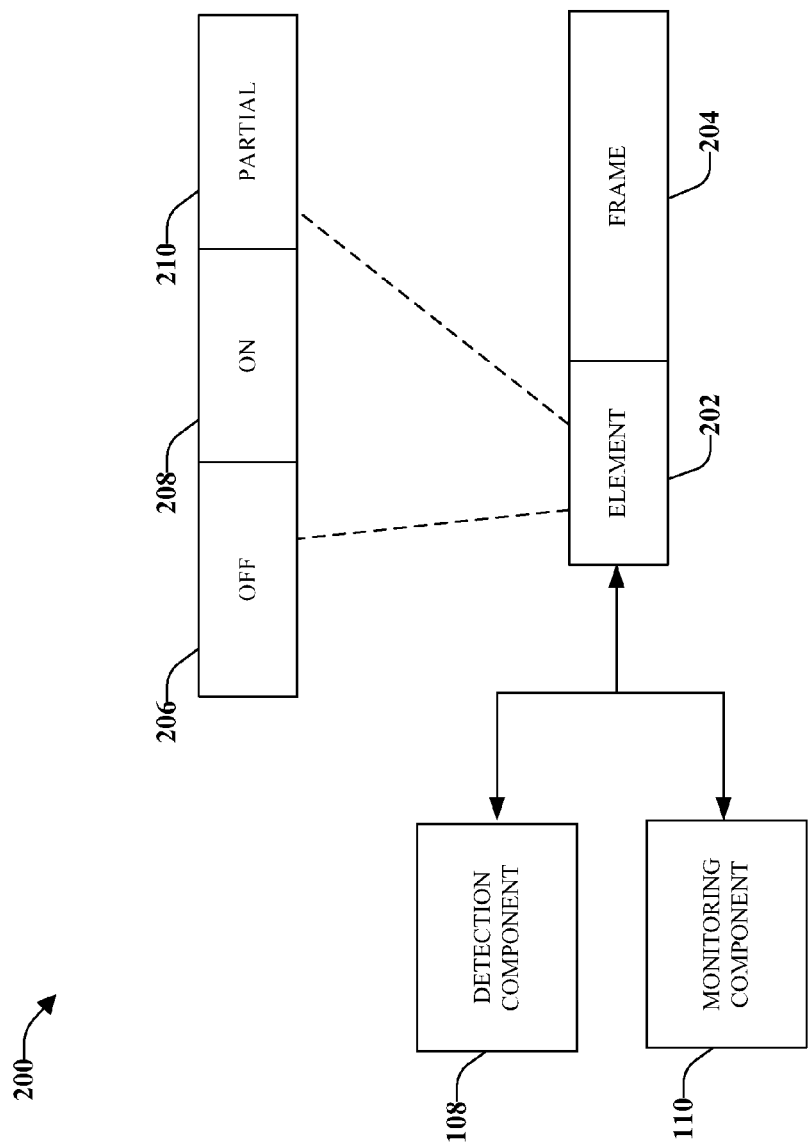
FIG. 2 is a block diagram illustrating an example, non-limiting embodiment of a system for determining prediction modes for media frames in accordance with various aspects and implementation described herein.

FIG. 2 is a block diagram illustrating an example, non-limiting embodiment of system 200 for determining prediction modes for media frames in accordance with various aspects and implementation described herein. Detection component 108 is provided to detect whether an element 202 is encoded in a bitstream associated with a frame 204 to indicate what type of prediction mode is used. Monitoring component 110 is provided to decode the element 202 to determine whether the frame 204 uses compound prediction.

Compound prediction modes use a combined predictor to efficiently compress media data. Combined predictors can be combined intra predictors, combined inter predictors, and both intra and inter predictors together. The two or more predictors can be combined using an average of the two or more values, or the significance of the value of each predictor on a per-pixel basis can be estimated, e.g., using a weighted average (for each pixel in the combined predictor) between the two individual predictors.

In some aspects of the present disclosure, when detection component 108 determines that an element 202 is prepended to frame 204, monitoring component 110 can analyze and/or decode the element 202 to determine whether compound prediction is enabled in the frame 204. If compound prediction is enabled in the frame 204, monitoring component 110 can determine whether frame 204 uses compound prediction throughout the frame or whether a subset of the frame 204 uses compound prediction.

In other aspects of the present disclosure, encoded into element 202 can be three different values 206, 208, and 210 that indicate respectively whether compound prediction is disabled or not present in frame 204, enabled and present in the entire frame 204, or whether compound prediction is enabled but used only partially throughout frame 204. The values for 206, 208, and 210 can be 0, 1, and 2, respectively, for example. Monitoring component 110 can analyze which value is encoded into element 202 to determine how compound prediction is used, if at all, in frame 204.

In some aspect of the present disclosure, if monitoring component 110 determines that element 202 has value 206 encoded into it, indicating that compound prediction is turned off in frame 204, no further action by the detection component 108 and monitoring component 110 is undertaken, and the frame is decoded and played back by the media stack 116 using non-compound prediction.

In other aspects of the present disclosure, if monitoring component 110 determines that element 202 has value 208, and accordingly that compound prediction is enabled throughout the frame 204, media stack 116 will decode frame 204 using compound prediction.

In some aspects of the present disclosure, monitoring component 110 can analyze element 202 and determine that element 202 has value 210, indicating that compound prediction is partially used throughout frame 204 or that frame 204 encodes at a lower level (e.g., a more granular level) whether compound prediction is used. In response to determining that compound prediction is partially used in frame 204 or that frame 204 encodes at a more granular level whether compound prediction is used, detection component 108 can scan frame 204 to identify subsets of frame 204 that have elements prepended to the subsets indicating whether the subset uses compound prediction.

Figure 3:
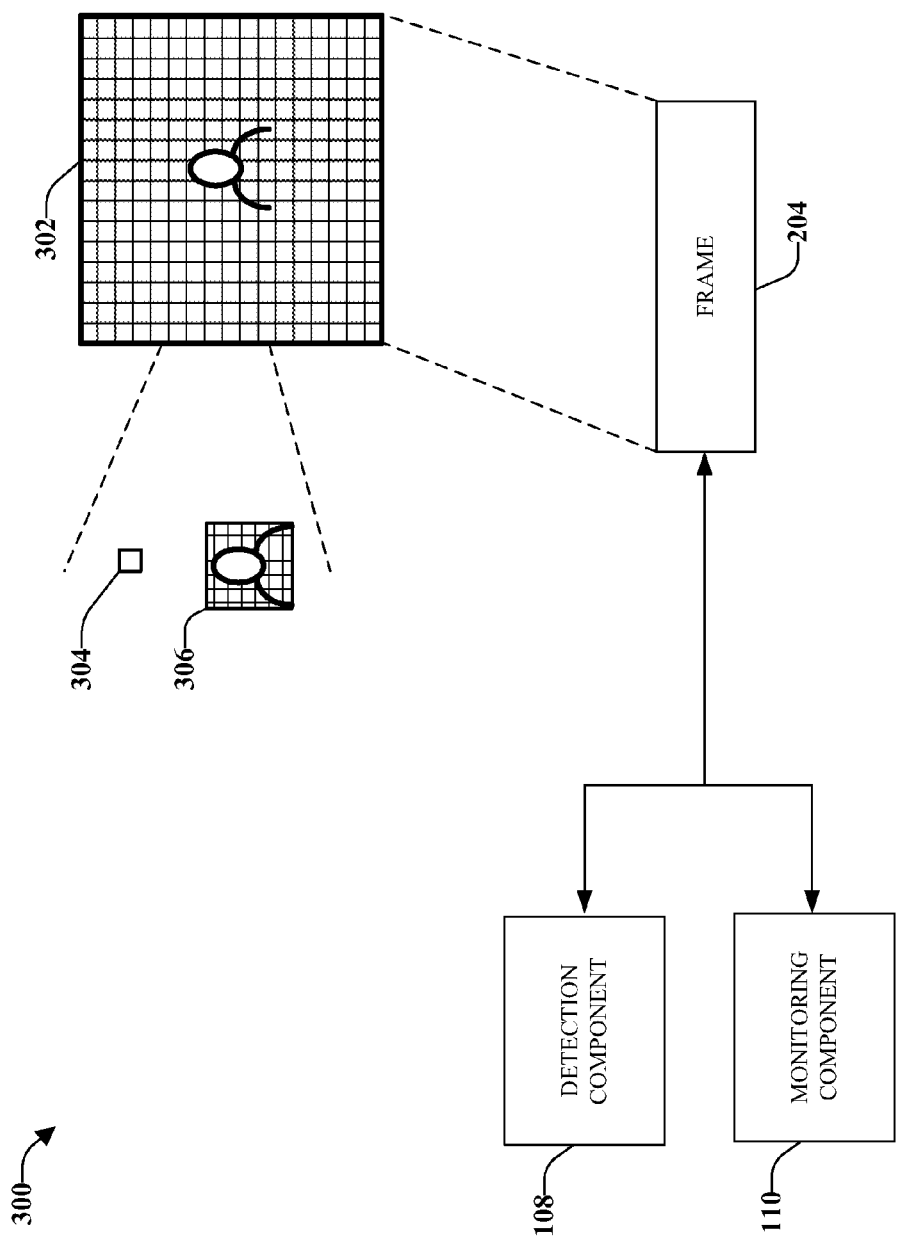
FIG. 3 is a block diagram illustrating an example, non-limiting embodiment of a system for determining prediction modes for media frames in accordance with various aspects and implementations described herein.

FIG. 3 is a block diagram illustrating an example, non-limiting embodiment of system 300 for determining prediction modes for subsets of media frame 204. Detection component 108 is provided to identify which subsets of frame 204 have elements prepended to them indicating whether compound prediction is used in that particular subset of frame 204. Upon determining that an element is prepended to the subset, monitoring component 110 can analyze the element to determine whether compound prediction is used in the subset.

Compound prediction can be enabled granularly on a per-macroblock or per-segment basis. Compound prediction employed on a per-macroblock can be referred to herein as hybrid compound prediction. Compound prediction employed on a per-segment can be referred to herein as segment compound prediction.

A segment can be a set of macroblocks that depict on object in a frame. If a frame does not use segmentation, compound prediction can be turned on with a per-macroblock flag that is coded in the bitstream. If segmentation in a frame is enabled, the frame can be split into distinct objects and the macroblocks that form the segment can have a common object identifiers indicating that the macroblocks are part of the same segment. An array of macroblocks 302 that form frame 204 is depicted in FIG. 3. An object shown by the outline of a person in array 302 can be represented by segment 306, which is a collection of macroblocks sharing a common object identifier.

In some aspects of the present disclosure, detection component 108 can determine that segment 306 has an element indicating a prediction mode, and monitoring component 110 can determine that the element prepended to segment 306 indicates that segment 306 uses compound prediction whereas other segments of frame 204 do not use compound prediction. In another aspect of the present disclosure, the element of a segment can indicate that compound prediction is used in a portion of the segment. In that case, monitoring component 110 can determine on a per-macroblock basis within the segment whether compound prediction is used. Accordingly, in an implementation in which a frame uses segmentation, an element on a per-segment basis can indicate whether a particular segment uses no compound prediction (e.g., with an element value of 0), uses compound prediction throughout the segment (e.g., with an element value of 1), or encodes at the per-macroblock level whether compound prediction is used (e.g., with an element value of 2).

In some aspects of the present disclosure, when hybrid compound prediction is used, the frame 204 (or in case when segmentation is enabled, each segment, e.g., segment 306) can code a custom probability in the bitstream (at the frame/segment level). The custom probability can indicate a probability that compound prediction is used in every macroblock in the frame. The custom probability can specify an entropy coder's probability that a dual prediction flag is set in each macroblock. The dual prediction flag can have two values: one indicating that the macroblock uses no compound prediction (e.g., with a value of 0) and one indicating that the macroblock uses compound prediction throughout (e.g., with a value of 1). It shall be appreciated that while the example values of 0, 1, and 2 are provided above, other values may be used and/or the values may be associated with different meanings. For example, the dual prediction flag can have a value of 1 indicating that the macroblock uses no compound prediction (rather than 0) and a value of 0 indicating that macroblock uses compound prediction throughout (rather than 1).

Accordingly, in some aspects of the disclosure, in case of low bitrate streams where compound prediction provides no or insufficient gain (e.g., in terms of quality/bitrate), compound prediction can be disabled at the frame level at the cost of a single bit in the frame bitstream. On the other hand, where compound prediction provides sufficient benefit (e.g., in terms of quality/bitrate), compound prediction can be turned on selectively to optimize that benefit.

Figure 4:
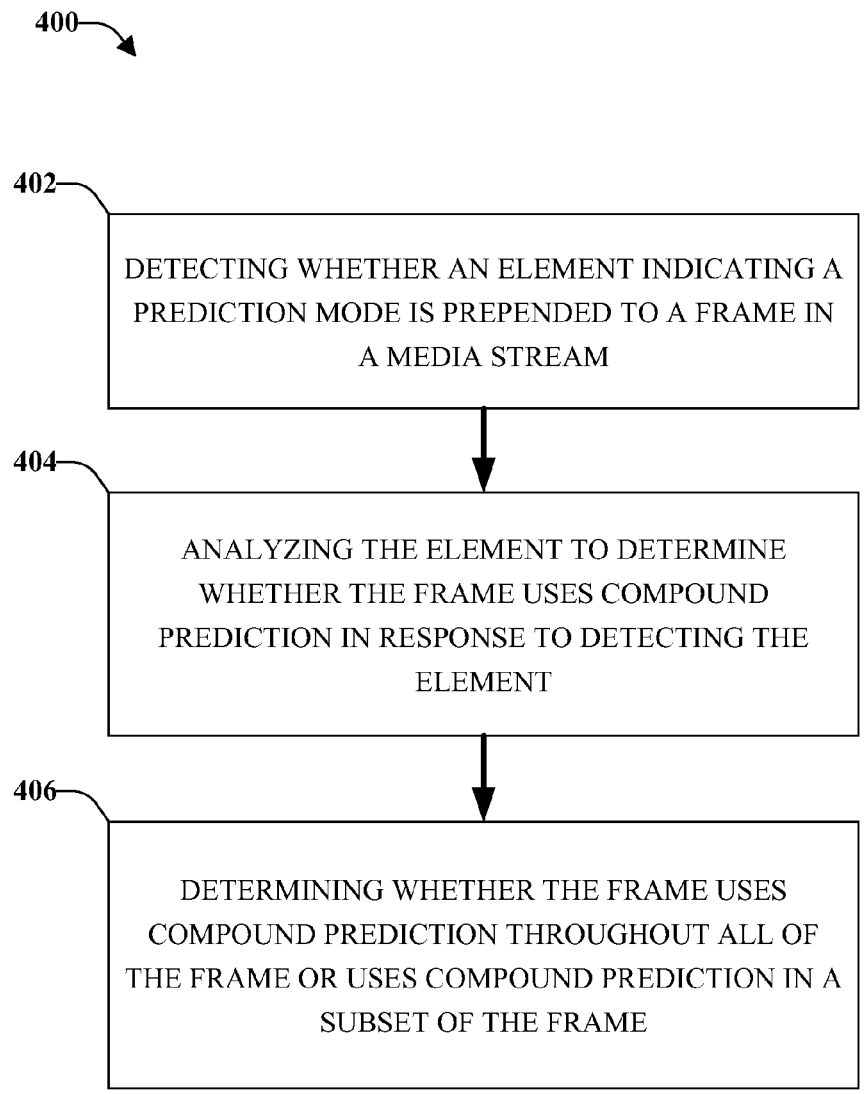
FIG. 4 illustrates a flow diagram of an example, non-limiting embodiment for determining prediction modes for media frames in accordance with various aspects and implementations described herein.

FIG. 4 illustrates an exemplary flow diagram 400 for a methodology according to an aspect of the present disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter. In addition, those skilled in the art will understand and appreciate that the method could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in FIG. 1-3 can be and are intended to be implementable as methods and/or in accordance with the following depicted method.

At 402, an element can be detected (e.g. by detection component 108) that indicates a prediction mode is prepended to a frame in a media stream. In response to detecting an element, at 404, the element is analyzed (e.g. by monitoring component 110) to determine whether the frame uses compound prediction. In some aspects of the present disclosure, the element will indicate that the frame does not use compound prediction. In other aspects of the present disclosure, the element will indicate that the frame does use compound prediction.

At 406, it is determined whether the frame uses compound prediction throughout all of the frame or uses compound prediction in a subset of the frame in response to determining that the frame uses compound prediction. The subset of the frame can be a macroblock or a subset of macroblocks with a common object identifier.

In one implementation, a component (e.g., detection component 108) detects an element that indicates at a frame-level whether a particular frame uses compound prediction. A component (e.g., monitoring component 110) analyzes the element to identify its value (e.g., whether it is 0, 1 or 2). A decoder can proceed with decoding the frame based on the value. For example, if the value is 2, the decoder may employ the detection component 108 to further detect an element that indicates at a segment-level whether a particular segment of the frame uses compound prediction. A component (e.g., monitoring component 110) can also analyze that segment-level element to identify its value (e.g., whether it is 0, 1 or 2). The decoder can proceed with decoding the segment based on this value. For example, if the value is 2, the decoder may employ the detection component 108 to further detect an element that indicates at a macroblock-level whether a particular macroblock of the segment (or frame if segmentation is not employed) uses compound prediction.

Figure 5:
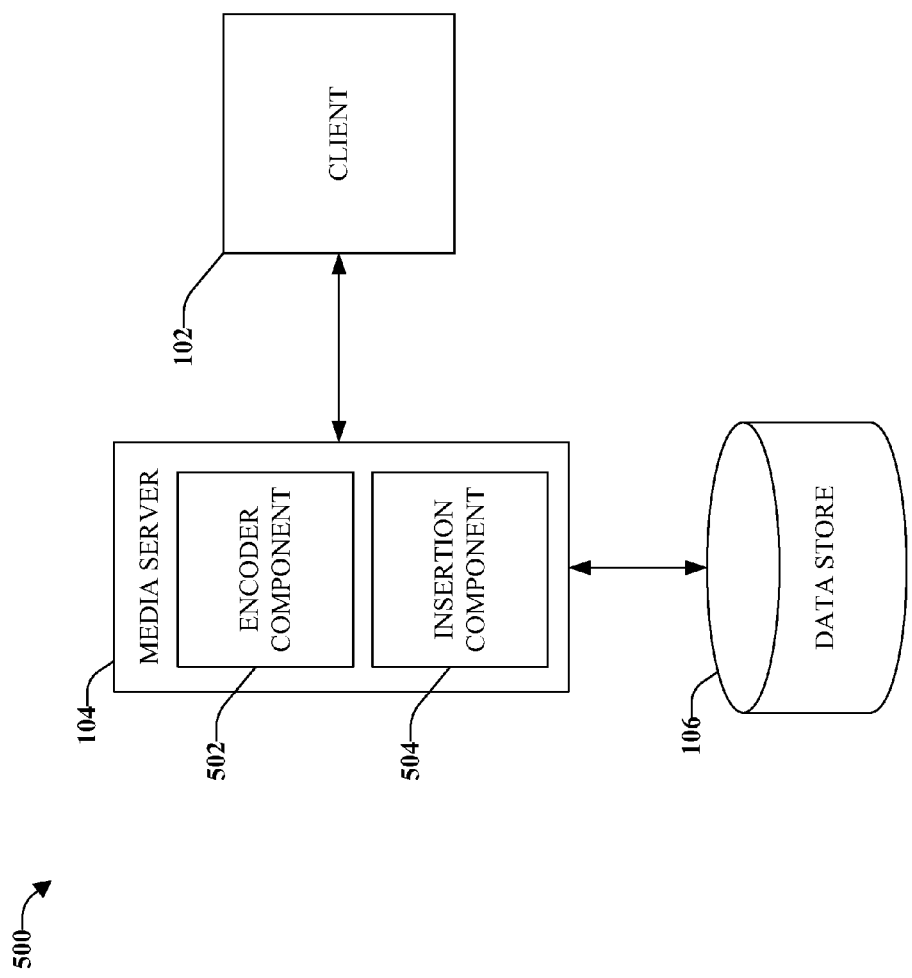
FIG. 5 is a block diagram illustrating an example, non-limiting embodiment of a system for signaling prediction modes in media frames in accordance with various aspects and implementations described herein.

FIG. 5 is a block diagram illustrating an example, non-limiting embodiment of a system 500 for signaling prediction modes in media frames in accordance with various aspects of the disclosure. Encoder component 502 can be provided to encode a frame using an optimal prediction mode setting. Insertion component 504 can be provided to insert an identifier into a bitstream associated with the frame that identifies the prediction mode setting used to encode the frame.

In some aspects of the present disclosure, the prediction mode setting can indicate whether compound prediction is used or not. The prediction mode setting can also indicate the type of compound prediction used, intra-intra, inter-inter, or intra-inter, or some other combination of predictors. The indication can also indicate whether the frame uses compound prediction over all of the frame, or over a subset of the frame.

In some aspects of the present disclosure, the encoder component 502 and insertion component 504 can be part of media server 104 that streams the media to the client 102. Alternatively, encoder component 502 and/or insertion component 504 can be separate from media server 104 and encode the media and/or insert the indicators before or after media server 104 streams the media from data store 106 to client 102.

Figure 6:
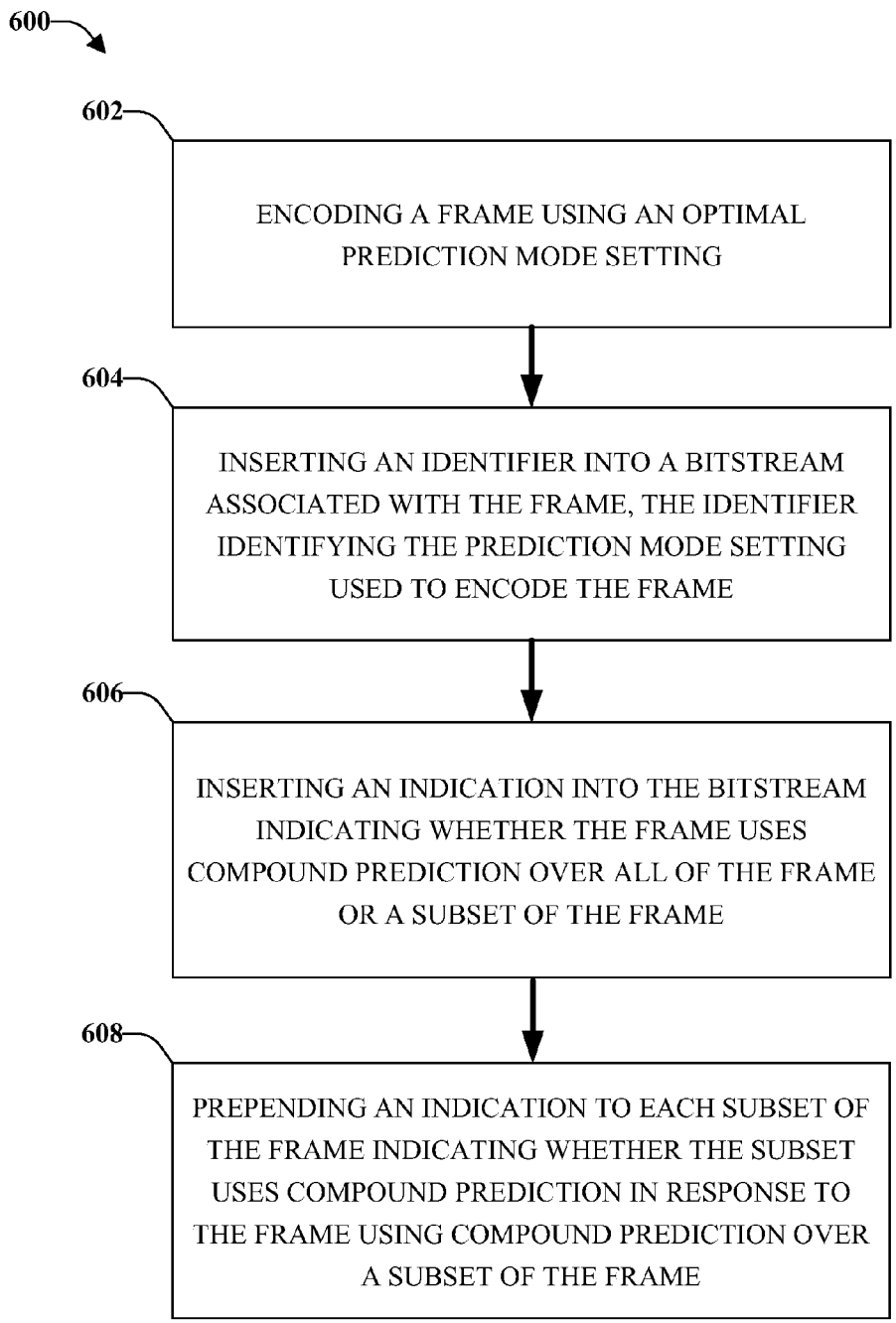
FIG. 6 illustrates a flow diagram of an example, non-limiting embodiment for signaling prediction modes for media frames in accordance with various aspects and implementations described herein.

FIG. 6 illustrates an exemplary flow diagram 600 for a methodology according to an aspect of the present disclosure. It is to be appreciated that the detailed description of such acts in FIG. 5 can be and are intended to be implementable as methods and/or in accordance with the following depicted method.

At 602, a frame is encoded (e.g. by encoder component 502) using an optimal prediction mode setting. The optimal prediction mode setting can be a variety of individual intra or inter predictors, or can be any combination of compound predictors. At 604, an identifier is inserted (e.g. by insertion component 504) into a bitstream associated with the frame. The identifier identifies the prediction mode setting used to encode the frame.

At 606, an indication is inserted into the bitstream indicating whether the frame uses compound prediction over all of the frame or a subset of the frame in response to how the encoder component encodes the frame. At 608, indications are prepended to each of the subsets of the frame indicating whether the subset uses compound prediction in response to indicating that the frame uses compound prediction over a subset of the frame.

In one implementation, a component (e.g., insertion component 504) inserts an element into a bitstream associated with a frame. The element indicates, at a frame-level, whether a particular frame uses compound prediction. In one implementation, the element can be one of three values (e.g., 0, 1, or 2), with each value indicating a different compound prediction setting for the frame, as described above. For example, a value of 2 may indicate that the frame encodes at a lower level (e.g., more granular level) whether compound prediction is used. In such an example, if the value of the element is 2 and the frame employs segmentation, a component (e.g., insertion component 504) can insert into the bitstream an element that indicates at a segment-level whether a particular segment of the frame uses compound prediction. In one implementation, the segment-level element can also be one of three values (e.g., 0, 1, or 2), with each value indicating a different compound prediction setting for the segment, as described above. For example, a value of 2 may indicate that the segment encodes at a macroblock level whether compound prediction is used. In another example, if the value of the frame-level element is 2 and the frame does not employ segmentation, a component (e.g., insertion component 504) can insert into the bitstream an element that indicates at a macroblock-level whether a particular macroblock of the frame uses compound prediction. In one implementation, the macroblock-level element can be one of two values (e.g., 0 or 1), with each value indicating a different compound prediction setting for the macroblock, as described above.

Figure 7:
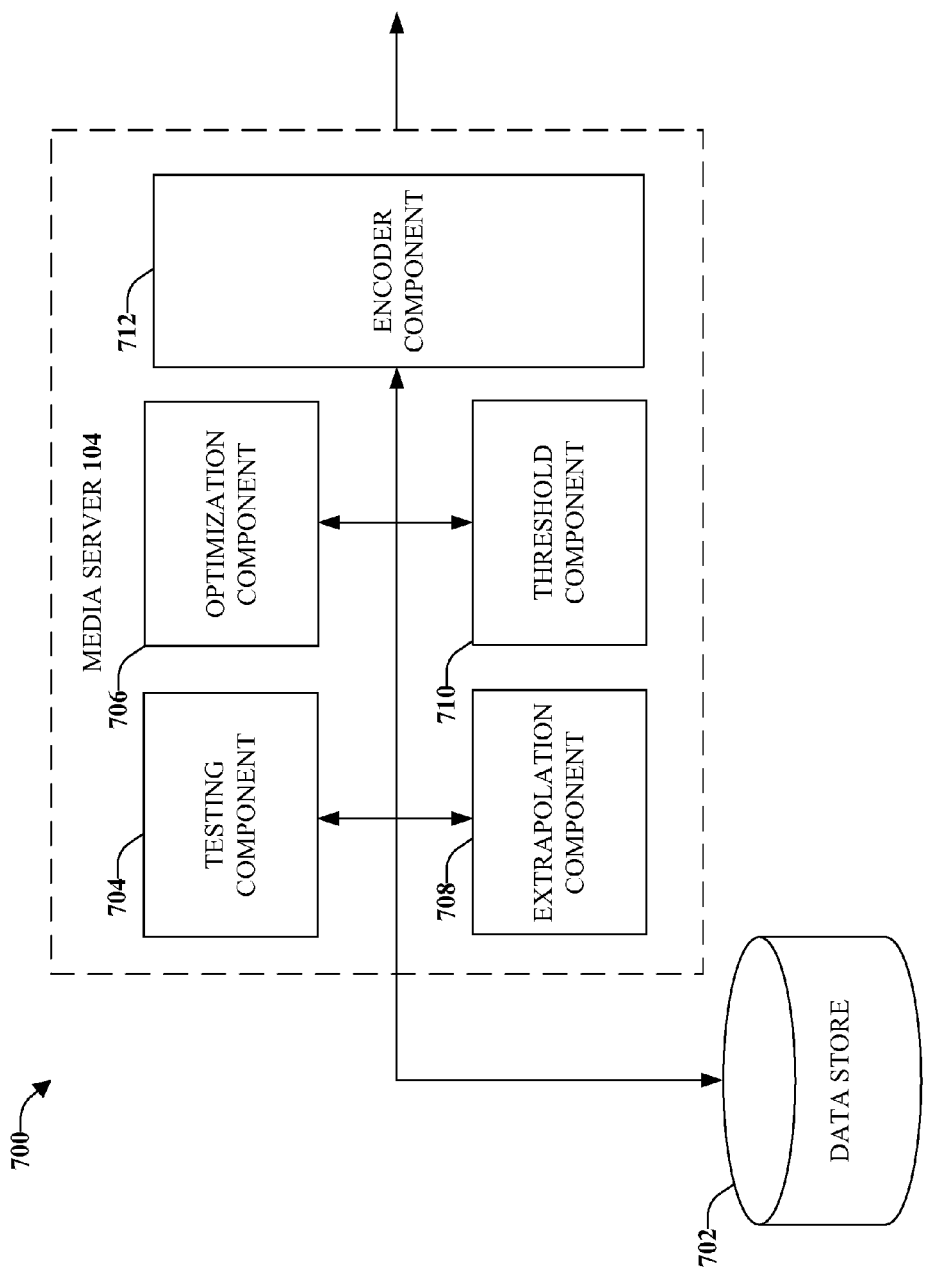
FIG. 7 is a block diagram illustrating an example, non-limiting embodiment of a system for optimizing compound prediction settings for media frames in accordance with various aspects and implementations described herein.
Figure 8:
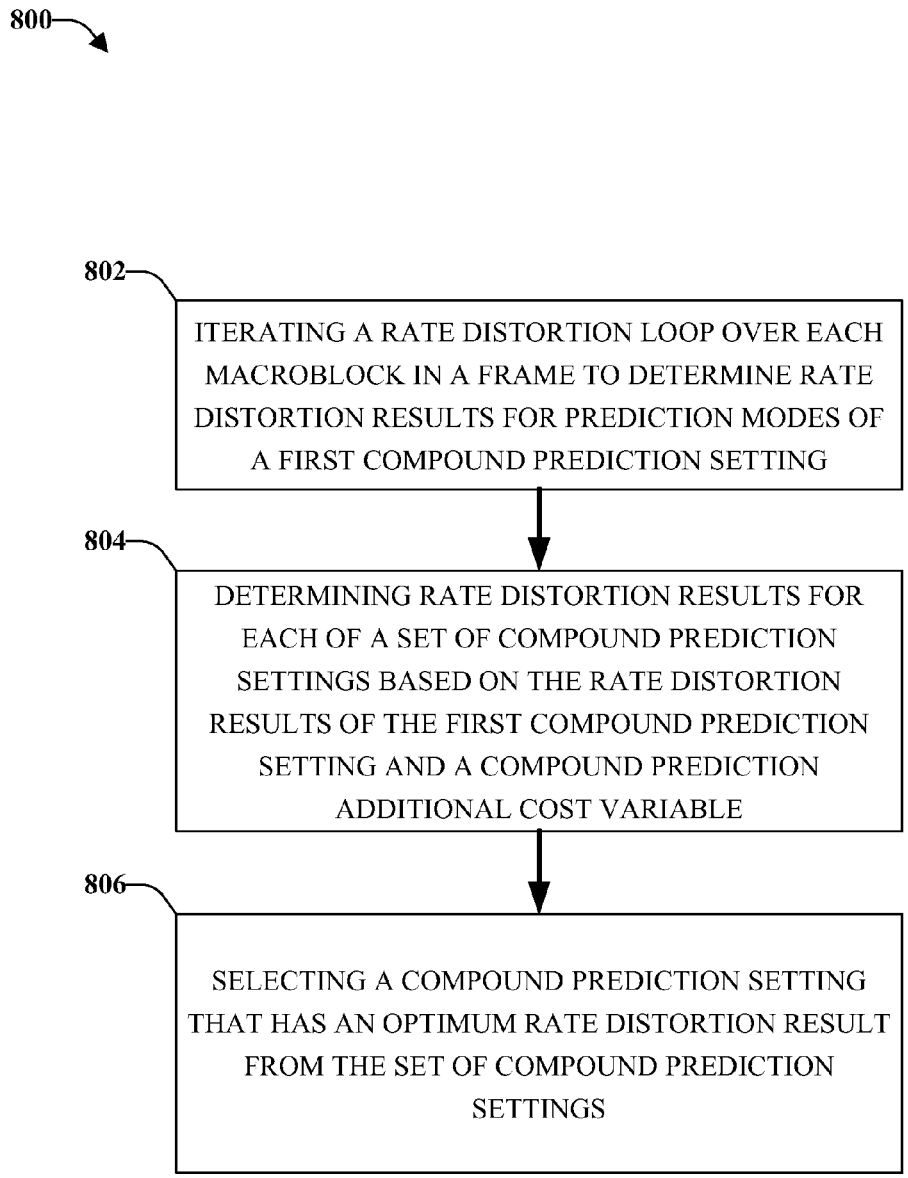
FIG. 8 illustrates a flow diagram of an example, non-limiting embodiment for optimizing compound prediction settings for media frames in accordance with various aspects and implementations described herein.

FIGS. 7 and 8 relate to an additional aspect of this disclosure: how to optimally choose whether to enable compound prediction, and what combination of modes to use that will lead to a highest predictive quality and lowest residual, i.e. the best resulting rate-distortion value for a given bitrate.

A typical rate-distortion loop uses a rate-distortion multiplier (sometimes referred to as lambda), which specifies the weight of rate versus distortion, i.e. "by how much should the distortion (residual signal) decrease to be worth adding a number of bits in rate". A typical loop will iterate over multiple available modes, e.g. various intra and inter predictors, calculate the cost in bits for coding the macroblock that way (mode+DCT coefficients), the rate (i.e. how many bits would coding the macroblock using that mode cost), and then the resulting rate/distortion result. Then, the encoder will select the mode with the best rate/distortion result. For speed reasons, the loop will apply thresholds to each coding mode, so that it does not test coding modes that are not likely to improve the rate/distortion result significantly, and it will keep track of mode counts, so that if a particular mode is just not used, it will not keep trying out that mode again over time.

In some applications, compound prediction can exponentially increase the complexity of the above looping (by having many possible combinations of prediction, as well as multiple ways of enabling compound prediction at the frame, segment or macroblock level). In one embodiment, to implement compound prediction support in rate distortion optimization loops, the loop (either based on whether and how compound prediction was enabled in previous frames, or based on defaults, e.g., user-set defaults or frame-type defaults) select whether (and how) to provisionally enable compound prediction for a current frame. For example, if previous frames used hybrid compound prediction, the loop provisionally enables hybrid compound prediction for the current frame also. Then, using the elected compound prediction setting (e.g., off, on, or hybrid—across the whole frame or per segment), the loop iterates over each macroblock, keeping track of the rate using that particular compound prediction setting. For example, if using hybrid prediction, the loop adds the cost of one bit to disable compound prediction for this macroblock to the calculated rate for the rate distortion calculation of this mode for this macroblock. Additionally, an encoder may keep track of this "compound prediction additional cost" in a separate variable for comparison between compound prediction settings later on.

At the end of the rate/distortion iteration for a given mode in a given macroblock, the following information can be available:
 whether this mode tests a single predictor or a compound predictor'
 the "compound prediction additional cost", or how much would it cost to specify at a per-macroblock level to enable or disable compound prediction if this frame or segment used hybrid coding of the per-macroblock compound prediction flag;
 the rate for this macroblock using the specified prediction setting; if the given setting is the hybrid setting, this rate is included the "compound prediction additional cost"; and
 the distortion if this mode were used.

Depending on the combination of mode and compound predictor setting, the encoder can verify whether this mode is allowed using the current provisional compound predictor settings. If the mode is allowed, the encoder can also determine if this rate distortion result provided the best coding mode of all modes tested so far for the current macroblock. In addition, since the encoder can determine how the rate would change if a different compound predictor setting were chosen (either adding or subtracting "compound prediction additional cost"), and determine whether this mode would be allowed if another compound predictor setting were to be used, the encoder can also keep track of alternative best rate distortion results, that cover the hypothetical case if a different compound predictor setting were chosen.

At the end of the loop, a rate distortion result is provided which is an optimal coding mode for the current macroblock given the current compound prediction setting, as well as a set of alternative rate distortion results which cover cases where alternative compound prediction settings are used, which may be either better or worse than the actual rate distortion result. By doing this for the whole macroblock, an encoder can sum these numbers and see which compound prediction setting will lead to an optimal coding for the frame, regardless of the original provisional setting.

In one implementation, the encoder changes the compound prediction setting and performs the rate distortion loop for the frame using the new setting. In one implementation, the encoder stores information on optimal compound prediction settings for encoding next frames using the most likely optimal compound prediction setting. Using such coding, the complexity of choosing an optimal compound prediction setting for the frame is integrated into the rate distortion loop, can be used to converge on an optimal result. In some implementations, low bitrate streams are likely to either turn compound prediction on or off at the frame-level, whereas medium-or-high bitrate streams may significantly benefit from the increased prediction quality, and enable compound prediction either in some macroblocks at the frame level (frame-hybrid prediction), or at the segment level (segment-hybrid prediction). Accordingly, in some implementations, an optimal or near-optimal compound prediction flag setting can be selected for a given encode/bitrate settings, without testing each individual compound prediction setting (on, off, segment-hybrid or frame-hybrid) individually.

FIG. 7 is a block diagram illustrating an example, non-limiting embodiment of a system 700 for optimizing compound prediction settings for media frames in accordance with various aspects of the disclosure. Media server 104 that facilitates the transmission of media from data store 702 to a client (e.g. 102) can have components that optimize the prediction mode setting of the media.

A testing component 704 is provided to iterate a rate distortion optimization loop over each macroblock in a frame of the media to determine a rate distortion result for each prediction mode of a provisional compound prediction setting.

An extrapolation component 708 is provided to determine a rate distortion result for each of a set of compound prediction settings based on the rate distortion results of the provisional compound prediction setting and a compound prediction additional cost variable. An optimization component 706 is provided to compare the rate distortion results for each of the set of compound prediction settings and select an optimum compound prediction setting from the set of compound prediction settings.

In an aspect of the present disclosure, testing component 704 selects the provisional compound prediction setting based on a user-set compound prediction setting, a compound prediction setting based on frame-type, and/or the compound prediction setting of a previous frame (e.g., a previous frame that is similar to the current frame in frame-type, content, etc.). The compound prediction setting indicates whether the frame uses compound prediction or not, and if so, whether it is used throughout the frame, or is a hybrid compound prediction mode on a per-macroblock or per-segment basis. For example, the compound prediction setting can indicate whether the frames does not use compound prediction, uses compound prediction throughout the frame, or uses per-segment or per-macroblock compound prediction. The testing component 704 can also reiterate the rate distortion loop over each macroblock in the frame using a second compound prediction setting.

The rate distortion optimization loop compares the amount of distortion (loss of video quality) against the amount of data required to encode the video (the rate) for each prediction mode in a compound prediction setting. The rate distortion results for each prediction mode in the compound prediction setting are determined for each macroblock in the frame.

A function of a compound prediction additional cost variable and the rate distortion result is used by extrapolation component 708 to determine a rate distortion result for each of a set of compound prediction settings. The compound prediction additional cost variable is the cost to specify at a per-macroblock level to enable or disable compound prediction if the frame or segment used hybrid coding of the per-macroblock compound prediction flag. The compound prediction additional cost variable is a relative cost between the provisional compound prediction setting and each of the set of compound prediction settings.

Since a rate distortion result for each prediction mode was determined by the testing component 704, adding or subtracting the compound prediction additional cost variable from the rate distortion result provides the rate distortion result for different compound prediction settings. Once the rate distortion results for different compound prediction settings has been calculated, optimization component 706 compares the rate distortion results for each of the set of compound predictions settings and selects an optimum compound prediction setting. Encoder component 712 then encodes the media frame using the selected compound prediction setting.

Signaling that a frame uses compound prediction involves a bandwidth cost. Therefore, for media associated with a low bitrate, signaling that compound prediction is enabled can negate bandwidth savings that compound prediction enabled.

Accordingly, in one implementation in which the media is streamed, threshold component 710 can monitor a bitrate of the media stream and instruct the optimization component 706 to select a non-compound prediction mode in response to the bitrate falling below a threshold value.

FIG. 8 illustrates a flow diagram of an example, non-limiting embodiment for optimizing compound prediction settings for media frames in accordance with various aspects of the disclosure. It is to be appreciated that the detailed description of such acts in FIG. 7 can be and are intended to be implementable as methods and/or in accordance with the following depicted method.

At 802, a rate distortion loop over each macroblock in a frame is iterated (e.g., by testing component 704) to determine rate distortion results for prediction modes of a provisional compound prediction setting. At 804, rate distortion results are determined (e.g. by extrapolation component 708) for each of a set of compound prediction settings based on the rate distortion results of the provisional compound prediction setting and a compound prediction additional cost variable.

The compound prediction additional cost variable is the cost to specify at a per-macroblock level to enable or disable compound prediction if the frame or segment used hybrid coding of the per-macroblock compound prediction flag. The compound prediction additional cost variable is a relative cost between the provisional compound prediction setting and each of the set of compound prediction settings. Subtracting or adding the compound prediction additional cost variable to the rate distortion result of a compound prediction setting provides the rate distortion result for a different compound prediction setting, provided the given prediction mode is valid in combination with the given compound prediction setting.

At 806, a compound prediction setting is selected (e.g. by optimization component 706) that has an optimum rate distortion result from the set of compound prediction settings. In implementation in which the media is streamed, the bitrate of the media stream can also be monitored, and when it falls below a threshold value, a non-compound prediction selection can be selected.

Exemplary Computing Device

Figure 9:
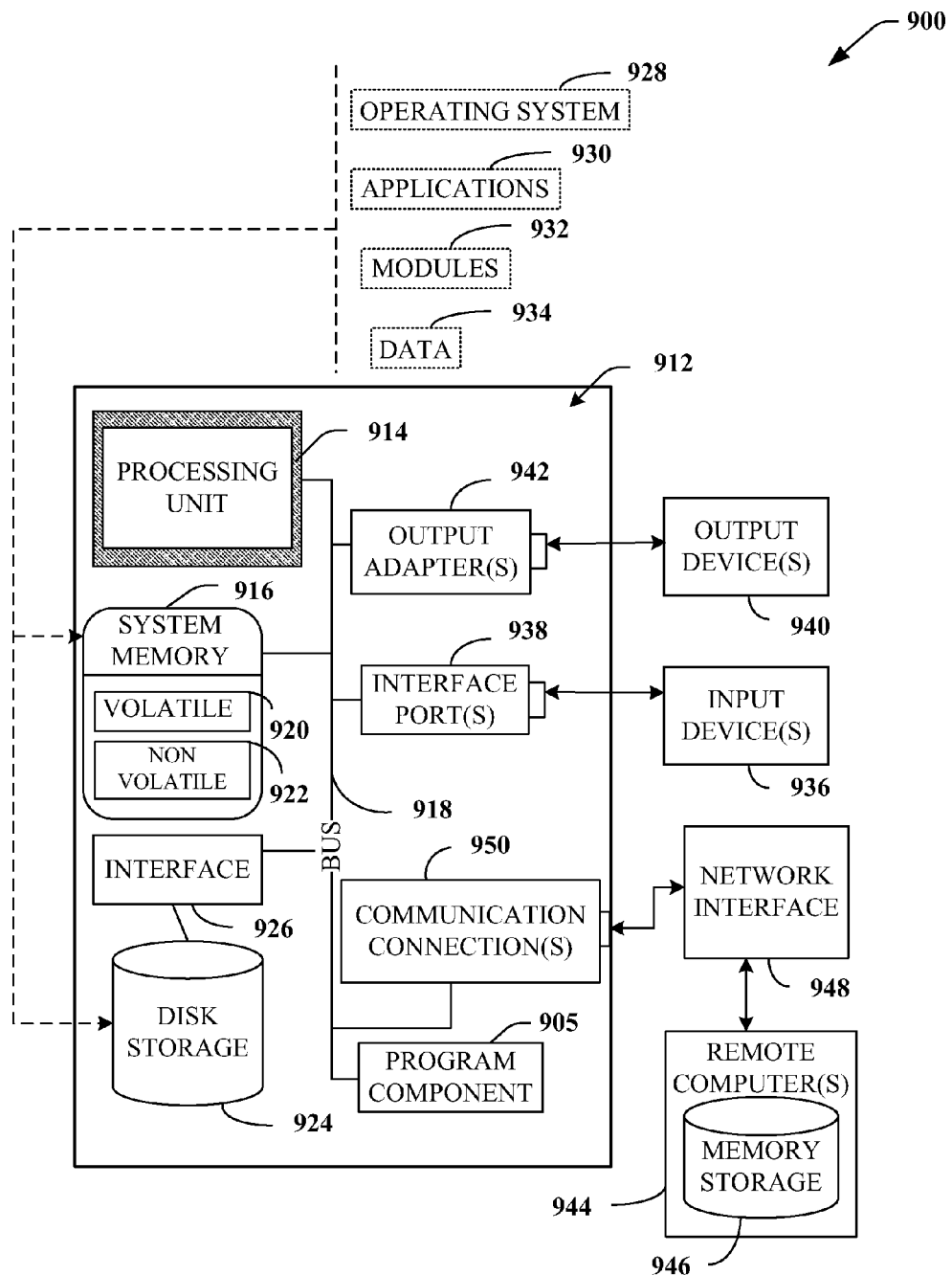
FIG. 9 is a block diagram illustrating an example computing device that is arranged in accordance with various aspects and implementations described herein.

With reference to FIG. 9, a suitable environment 900 for implementing various aspects of this disclosure includes a computing device 912. The computing device 912 includes a processing unit(s) 914, a system memory 916, and a system bus 918. The system bus 918 couples system components including, but not limited to, the system memory 916 to the processing unit 914. The processing unit(s) 914 can be any of various available processors. Dual microprocessors and other multiprocessor architectures also can be employed as the processing unit(s) 914.

The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 994), and Small Computer Systems Interface (SCSI).

The system memory 916 includes volatile memory 920 and nonvolatile memory 922. The basic input/output system (BIOS), containing the basic routines to transfer information between elements within the computing device 912, such as during start-up, is stored in nonvolatile memory 922. By way of illustration, and not limitation, nonvolatile memory (e.g., 922) can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory (e.g., 920) includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM. Additionally, the disclosed memory components of systems or methods herein are intended to include, without being limited to including, these and any other suitable types of memory.

Computing device 912 can also include removable/non-removable, volatile/non-volatile computer storage media. FIG. 9 illustrates, for example, a disk storage 924. Disk storage 924 includes, but is not limited to, devices like a magnetic disk drive, flash drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used, such as interface 926.

FIG. 9 also depicts software that acts as an intermediary between users and the basic computer resources described in the suitable operating environment 900. Such software includes, for example, an operating system 928. Operating system 928, which can be stored on disk storage 924, acts to control and allocate resources of the computing device 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems.

A user enters commands or information into the computing device 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computing device 912, and to output information from computing device 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computing device 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computing device 912. For purposes of brevity, only a memory storage device 946 is illustrated with remote computer(s) 944. Remote computer(s) 944 is logically connected to computing device 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computing device 912, it can also be external to computing device 912. The hardware/software necessary for connection to the network interface 948 includes, for exemplary purposes only, internal and external technologies such as, modems including regular telephone grade modems, cable modems and DSL modems, ISDN adapters, Ethernet cards, and wireless networking cards.

In accordance with various aspects and implementations, the computing device 912 can be used to optimize compound prediction settings for media frames and insert an element indicating the compound prediction setting used into the bitstream. Computing device 912 can also detect and analyze elements in bitstreams that identify the compound prediction setting. As more fully disclosed herein, in some implementations, the computing device 912 can include one or more processors (e.g., processing units 114, 914) that can be used to process data, including processing data to perform various tasks (e.g., iterating rate distortion optimization loops, extrapolating the results to determine rate distortion results for other compound prediction settings, inserting elements indicating the compound prediction setting used into the bitstream of the media, and detecting and decoding the elements to determine the type of compound prediction setting used to encode the media, etc.). The computing device 912 can include a program component 905 that can be associated with (e.g., communicatively connected to) the one or more processors. The program component 905 can contain, for example, a detection component, a monitoring component, a encoder component, an insertion component, a testing component, an extrapolation component, an optimization component and a threshold component and/or other components, which can respectively function as more fully disclosed herein, to facilitate optimizing compound prediction settings for media.

Exemplary Networked and Distributed Environments

Figure 10:
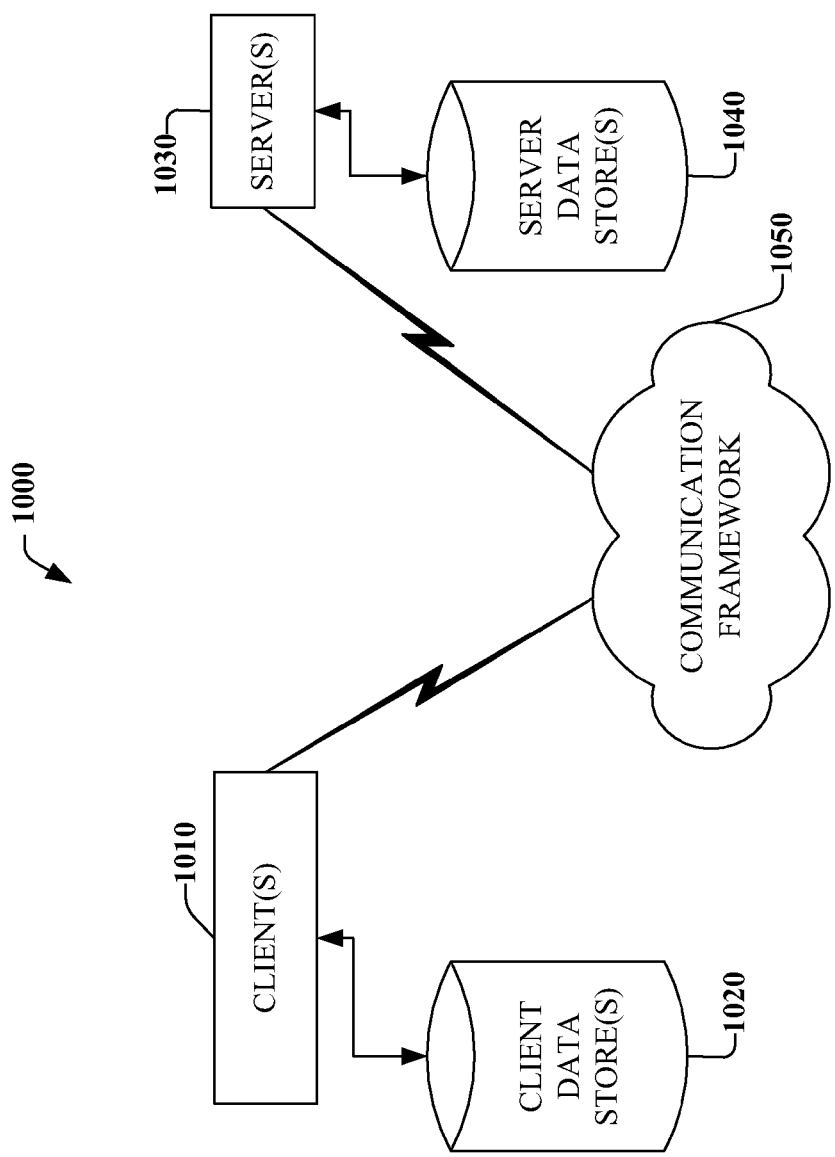
FIG. 10 is a block diagram illustrating an example networking environment in accordance with various aspects and implementations of this disclosure.

FIG. 10 is a schematic block diagram of a sample-computing environment 1000 in accordance with implementations of this disclosure. The system 1000 includes one or more client(s) 1010. The client(s) 1010 can be hardware and/or software (e.g., threads, processes, computing devices). The system 1000 also includes one or more server(s) 1030. Thus, system 1000 can correspond to a two-tier client server model or a multi-tier model (e.g., client, middle tier server, data server), amongst other models. The server(s) 1030 can also be hardware and/or software (e.g., threads, processes, computing devices). The servers 1030 can house threads to perform transformations by employing this disclosure, for example. One possible communication between a client 1010 and a server 1030 may be in the form of a data packet transmitted between two or more computer processes.

The system 1000 includes a communication framework 1050 that can be employed to facilitate communications between the client(s) 1010 and the server(s) 1030. The client(s) 1010 are operatively connected to one or more client data store(s) 1020 that can be employed to store information local to the client(s) 1010. Similarly, the server(s) 1030 are operatively connected to one or more server data store(s) 1040 that can be employed to store information local to the servers 1030.

It is to be appreciated and understood that components, as described with regard to a particular system or method, can include the same or similar functionality as respective components (e.g., respectively named components or similarly named components) as described with regard to other systems or methods disclosed herein.

It is to be noted that aspects or features of this disclosure can be used with substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be used with legacy telecommunication technologies, e.g., GSM. In addition, mobile as well non-mobile networks (e.g., the Internet, data service network such as internet protocol television (IPTV), etc.) can be used with aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Reference throughout this specification to "one implementation," or "an implementation," or "one embodiment," or "an embodiment" means that a particular feature, structure, or characteristic described in connection with the implementation or embodiment is included in at least one implementation or one embodiment. Thus, the appearances of the phrase "in one implementation," or "in an implementation," or "in one embodiment," or "in an embodiment" in various places throughout this specification can, but are not necessarily, referring to the same implementation or embodiment, depending on the circumstances. Furthermore, the particular features, structures, or characteristics may be combined in any suitable manner in one or more implementations or embodiments.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

What has been described above includes examples of systems and methods of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method comprising:
employing a processor to execute computer executable components stored in memory to perform the following acts:
selecting a compound prediction mode setting based on a rate distortion setting that is determined based on a rate distortion result of a provisional compound prediction setting and a compound prediction additional cost variable;
encoding a frame using the selected compound prediction mode setting; and
inserting an element into a bitstream associated with the frame, the element indicating whether the frame uses compound prediction.

2. The method of claim 1, wherein the element further indicates whether the frame uses compound prediction throughout the frame or in a subset of the frame.

3. The method of claim 2, further comprising prepending an indication to each subset of the frame indicating whether the subset uses compound prediction in response to the element indicating the frame uses compound prediction in a subset of the frame.

4. A media encoding system comprising:
a memory that has stored thereon computer executable components; and
a processor that executes the following computer executable components stored in the memory:
a testing component that iterates a rate distortion optimization loop over each macroblock in a frame to determine rate distortion results for prediction modes of a provisional compound prediction setting;
an extrapolation component that determines a rate distortion result for each of a set of compound prediction settings based on the rate distortion results of the provisional compound prediction setting and a compound prediction additional cost variable; and
an optimization component that compares the rate distortion results for each of the set of compound prediction settings and selects a compound prediction setting.

5. The media encoding system of claim 4, wherein the provisional compound prediction setting is selected based on a compound prediction setting determined to be optimal in a previous frame.

6. The media encoding system of claim 4, wherein the compound prediction additional cost variable is a relative cost between the provisional compound prediction setting and each of the set of the compound prediction settings.

7. The media encoding system of claim 4, wherein the testing component reiterates the rate distortion optimization loop over each macroblock in the frame using a second compound prediction setting to determine a rate distortion result for the second compound prediction setting.

8. The media encoding system of claim 4, further comprising a threshold component that monitors a bitrate of a media stream associated with the frame, and instructs the optimization component to select a non-compound prediction mode in response to the bitrate being below a threshold value.

9. A method comprising:
employing a processor to execute computer executable components stored in memory to perform the following acts:
iterating a rate distortion loop over each macroblock in a frame to determine rate distortion results for predictions modes of a provisional compound prediction setting;
determining rate distortion results for each of a set of compound prediction settings based on the rate distortion results of the provisional compound prediction setting and a compound prediction additional cost variable; and selecting a compound prediction setting based on the rate distortion results from the set of compound prediction settings.

10. The method of claim 9, further comprising selecting the provisional compound prediction setting based on a compound prediction setting determined to be optimal in a previous frame.

11. The method of claim 9, further comprising reiterating the rate distortion loop over each macroblock in the frame using a second compound prediction setting.

12. The method of claim 9, further comprising:
monitoring a media stream associated with the frame to determine a bitrate of the media stream; and
selecting a non-compound prediction mode in response to the bitrate falling below a threshold bitrate.

13. The method of claim 1, further comprising: determining the provisional compound prediction setting based on a compound prediction setting determined to be optimal in a previous frame.

14. The method of claim 1, further comprising reiterating selecting the compound prediction mode setting over each macroblock in the frame.

15. The method of claim 1, further comprising:
monitoring a media stream associated with the frame to determine a bitrate of the media stream; and
selecting a non-compound prediction mode in response to the bitrate falling below a threshold bitrate.

16. A system, comprising:
a memory that has stored thereon computer-executable components; and
a processor that executes the following computer executable components stored in the memory:
a selection component that selects a compound prediction mode setting based on an rate distortion setting that is determined based on a rate distortion result of a provisional compound prediction setting and a compound prediction additional cost variable;
an encoder component that encodes a frame using the selected compound prediction mode setting; and
an insertion component that inserts an element into a bitstream associated with the frame, wherein the element indicates whether the frame uses compound prediction.

17. The system of claim 16, wherein the element indicates whether the frame uses compound prediction throughout the frame or in a subset of the frame.

18. The system of claim 17, wherein the insertion component prepends an indication to each subset of the frame indicating whether the subset uses compound prediction in response to the element indicating the frame uses compound prediction in a subset of the frame.

19. The system of claim 16, wherein the compound prediction mode setting indicates whether the compound prediction mode is at least one of enabled, disabled, or hybrid.

20. The system of claim 16, wherein the provisional compound prediction setting is based on a compound prediction setting determined to be optimal in a previous frame.

21. The system of claim 16, wherein the selection component reiterates the selection of the compound prediction mode setting over each macroblock in the frame.

22. A non-transitory computer readable storage medium comprising computer-executable instructions, that in response to execution, cause a computing system to perform operations, comprising:
selecting a compound prediction mode setting based on an rate distortion setting that is determined based on a rate distortion result of a provisional compound prediction setting and a compound prediction additional cost variable;
encoding a frame using the selected compound prediction mode setting; and
inserting an element into a bitstream associated with the frame, the element indicating whether the frame uses compound prediction.

23. The non-transitory computer readable storage medium of claim 22, wherein the operations further comprise prepending an indication to each subset of the frame indicating whether the subset uses compound prediction in response to the element indicating the frame uses compound prediction in a subset of the frame.

* * * * *

UNITED STATES PATENT AND TRADEMARK OFFICE
CERTIFICATE OF CORRECTION

PATENT NO. : 8,737,824 B1  
APPLICATION NO. : 13/416375  
DATED : May 27, 2014  
INVENTOR(S) : Bultje Page 1 of 1

It is certified that error appears in the above-identified patent and that said Letters Patent is hereby corrected as shown below:

In the Claims

Column 19, Claim 16, Line 37, "based on an rate" should be "based on a rate"

Column 20, Claim 22, Line 26, "based on an rate" should be "based on a rate"

Signed and Sealed this  
Fifth Day of August, 2014

Michelle K. Lee  
*Deputy Director of the United States Patent and Trademark Office*